United States Patent [19]

Braun et al.

[11] Patent Number: 5,792,250
[45] Date of Patent: Aug. 11, 1998

[54] PROCESS FOR THE PRODUCTION OF INORGANICALLY COATED PIGMENTS AND FILLERS

[75] Inventors: Rolf-Michael Braun, Krefeld; Jürgen Kischkewitz, Ratingen; Hilmar Rieck, Krefeld, all of Germany; Udo Holtmann, Lt 10-Lauro de Freitas/Bahia, Brazil

[73] Assignee: Bayer Aktiengesellschaft, Germany

[21] Appl. No.: 868,354

[22] Filed: Jun. 3, 1997

[30] Foreign Application Priority Data

Jun. 25, 1996 [DE] Germany ............... 196 25 267.9

[51] Int. Cl.$^6$ ...................................................... C09C 1/22
[52] U.S. Cl. .................... 106/459; 106/436; 106/437; 106/438; 106/439; 106/441; 106/442; 106/443; 106/446; 106/450; 106/454; 106/456; 106/457
[58] Field of Search ...................... 106/436, 437, 106/438, 441, 442, 443, 446, 450, 454, 456, 457, 459, 439

[56] References Cited

U.S. PATENT DOCUMENTS

| | | | |
|---|---|---|---|
| 3,649,322 | 3/1972 | Foss | 106/446 |
| 3,861,946 | 1/1975 | Waitkins et al. | 428/404 |
| 4,199,370 | 4/1980 | Brand | 106/446 |
| 5,451,246 | 9/1995 | Nomura et al. | 75/348 |

FOREIGN PATENT DOCUMENTS

| | | |
|---|---|---|
| 0 704 500 | 4/1996 | European Pat. Off. . |
| 1207 512 | 10/1970 | United Kingdom . |

OTHER PUBLICATIONS

Database WPI Week 8901 Derwent Publications Ltd., London, GB; & SU 1 406 136 A(Guzairove) Jun. 30, 1988 AN91–360327.

Database WPI Week 9149 Derwent Publications Ltd., London, GB; & SU 1 640 136 Pochekovskii) Apr. 7, 1991 AN 89–006959.

Database WPI Week 8349 Derwent Publications Ltd., London, GB; & SU 994 524 A(Guzairove) Feb. 7, 1983 AN 83–837628.

*Primary Examiner*—Mark L. Bell
*Assistant Examiner*—Scott L. Hertzog
*Attorney, Agent, or Firm*—Connolly & Hutz

[57] ABSTRACT

This invention relates to a process for the production of inorganically coated pigments and fillers and to the use thereof.

8 Claims, No Drawings

PROCESS FOR THE PRODUCTION OF INORGANICALLY COATED PIGMENTS AND FILLERS

The invention relates to a process for the production of inorganically coated pigments and fillers and to the use thereof.

Inorganic pigments, such as iron oxide, titanium oxide, rutile mixed phases and spinels for example, are used to a considerable extent in paints, lacquers, plastics and paper. To improve and stabilise various physical properties, such as color, texture, durability, temperature resistance, gloss retention with respect to chalking and yellowing and weathering resistance, the pigments and fillers are often post-treated during manufacture. This treatment comprises coating the pigment or filler with small amounts of one or more metal oxides, hydrated oxides or hydroxides. In addition to silicon, titanium and zirconium compounds, for example, aluminum compounds are also of particular significance.

Treatment is conventionally performed by firstly producing an aqueous suspension of the pigment or filler and precipitating the desired hydrated metal oxides, metal oxides or metal hydroxides out of the metallic salt solutions added to the slurry. The pigments or fillers may be coated, for example, with zirconium dioxide, aluminum oxide or titanium dioxide by the addition to the suspension of a solution, for example of sulphates or chlorides of the metals, in the desired amount and concentration, whereupon the pH value of the suspension is adjusted virtually to neutral by the addition of a base or an alkaline precipitating agent. Examples of possible bases or precipitating agents are ammonium hydroxide, sodium hydroxide or potassium hydroxide, as described in DE-A-1 592 937 for example. For silicon dioxide coatings it is also possible to add alkaline solutions of silicates, for example sodium silicate, to the suspension and to effect precipitation with acidic precipitating agents, such as mineral acids, conventionally sulphuric acid, as described in EP-A-0 078 632 for example.

Subsequent to the post-treatment, the coated pigment or coated filler is separated from the suspension (for example by filtration, sedimentation or centrifugation), freed of the soluble salts by washing, dried and, in addition, optionally organically modified prior to final milling.

To achieve satisfactory processing of the pigments or fillers produced in this way it is especially necessary for the pigments or fillers to exhibit flocculation stability, high resistivity and favorable rheological properties. These properties not only depend on the composition and number of the coats but are also determined by the boundary conditions of the inorganic post-treatment, especially the pH value, the temperature, the amount and type of treatment chemicals and the intensity of the washing effected prior to drying of the pigments or fillers (for example GB-A-1 034 345, in particular Example 1).

In order to achieve by the above-described process the properties, such as flocculation stability or resistivity for example, necessary for the respective applications, very high expenditure on washing of the pigments or fillers is required, expressed, for example, in high levels of washing water consumption and/or the need for a large filter area.

An object of the present invention was thus to reduce washing water consumption, to reduce the filter area required for washing or to increase the washing capacity without impairing the other properties of the pigments or fillers.

Surprisingly, it was possible to achieve this object by the process according to the invention.

The present invention provides a process for the production of inorganically coated pigments or fillers, wherein an aqueous suspension of the appropriate untreated pigment or filler is produced, at least one coating of an oxide, hydroxide or hydrated oxide of one or more metals from the group comprising titanium, aluminum, zirconium, silicon, cerium and zinc is precipitated by the addition of the appropriate metallic salt solutions, wherein the outermost coating is a coating of hydroxide or hydrated oxide of aluminum, the aqueous suspension is adjusted approximately to neutral prior to separation of the pigments or fillers, the pigments or fillers treated in this manner are separated, the separated pigments or fillers are washed, optionally dried and organically modified and then disagglomerated. To produce the outer coating of aluminum hydroxide or hydrated aluminum oxide, an acidic-reacting, water-soluble aluminum compound in an amount of 0.1 to 3 wt.%, calculated as $Al_2O_3$ and relative to the pigment or filler and a water-soluble, alkaline-reacting aluminum compound in an amount of 0.1 to 3 wt.%, calculated as $Al_2O_3$ and relative to the pigment or filler are added to the pigment or filler suspension simultaneously or in succession, in such a quantity ratio that, after completion of the addition, a pH value of from 4 to 10 is established in the suspension without further acidic- or alkaline-reacting components being added.

Prior to the inorganic post-treatment, the aqueous pigment or filler suspension is preferably adjusted to a solids content of from 100 to 300 g/l, particularly preferably from 150 to 250 g/l, and to a temperature of from 30° to 90° C., particularly preferably from 40° to 60° C.

A particular embodiment of the process according to the invention involves the application of only one hydrated aluminum oxide or aluminum hydroxide coating to the pigment or filler.

A further particular embodiment of the process according to the invention involves the application, prior to hydrated aluminum oxide or aluminum hydroxide precipitation, of one or more coatings of oxides, hydroxides or hydrated oxides of metals from the group comprising titanium, silicon, zirconium, cerium and zinc.

Addition of the water-soluble, acidic-reacting aluminum compound and addition of the water-soluble, alkaline-reacting aluminum compound are preferably effected simultaneously, in such a way that the pH value of the suspension is constant during the entire addition time and lies between 4 and 10, particularly preferably between 5 and 9, most preferably between 6 and 8.

The temperature of the suspension is preferably maintained between 25° and 70° C.

Titanium dioxide and iron oxides are preferred pigments.

The pigments and fillers produced in accordance with the process according to the invention are used for coloring paints, lacquers, plastics and paper.

To adapt the pigment or filler to the processing medium in which the pigment or filler is used, the pigment or filler is optionally modified with an organic coating agent before or after, preferably after washing or before or after final grinding (disagglomeration).

The process according to the invention is characterised by low washing water consumption during washing of the pigments or fillers. This means that less waste water is formed during the production of pigments and fillers of the same quality and exhibiting the same application properties, a smaller filter area is required for a given amount of product or a larger amount of product may be washed on a given filter area.

Moreover, with the process according to the invention it is possible to obtain products of higher quality with the same washing water consumption as in the case of conventionally treated pigments and fillers.

The following Examples are intended to illustrate the invention in greater detail. Example 1

A $TiO_2$ rutile pigment produced using the sulphate process was post-treated inorganically as follows.

3.0 kg of ground $TiO_2$ pigment were dispersed in 9.0 l of water with the addition of a dispersing agent. The suspension was stirred and kept at 60° C. throughout post-treatment. The pH value of the suspension was pH 10.6. 268 ml of titanyl sulphate solution (120 g/l $TiO_2$), corresponding to 1.07 wt.% of $TiO_2$ relative to the pigment used, were added to the stirred suspension over a period of 15 minutes. The pH value thereafter was 1.3. After stirring for a further 5 minutes, 69 ml of sodium silicate solution (350 g/l $SiO_2$), corresponding to 0.8 wt.% of $SiO_2$, relative to the pigment used, were added over a period of 15 minutes. The pH value thereafter was pH 1.4. After stirring for a further 5 minutes, 231 ml of sodium aluminate solution (260 g/l $Al_2O_3$), corresponding to 2.0 wt.% of $Al_2O_3$ relative to the pigment used, were added over a period of 15 minutes. After a further 5 minutes of stirring, the pH value of the suspension was pH 9.2. 60 ml of aluminum sulphate solution (100 g/l $Al_2O_3$), corresponding to 0.2 wt.% of $Al_2O_3$ relative to the pigment used, were then added over a period of 15 minutes. The pH value was 7.5. After stirring for a further 30 minutes, the post-treated pigment was separated in a filtering flask through "Blauband" filters (Schleicher & Schuell) at 300 mbar and washed with deionised water at 80° C. in a water pigment weight ratio of 6:1. The resistivity of the pigment was 8 400 Ohm.cm.

Example 2 (Comparison)

A $TiO_2$ rutile pigment produced using the sulphate process was post-treated in-organically as follows.

3.0 kg of ground $TiO_2$ pigment were dispersed in 9.0 l of water with the addition of a dispersing agent. The suspension was stirred and kept at 60° C. throughout post-treatment. The pH value of the suspension was pH 10.6. 268 ml of titanyl sulphate solution (120 g/l $TiO_2$), corresponding to 1.07 wt.% of $TiO_2$ relative to the pigment used, were added to the stirred suspension over a period of 15 minutes. The pH value thereafter was 1.3. After stirring for a further 5 minutes, 69 ml of sodium water glass solution (350 g/l $SiO_2$), corresponding to 0.8 wt.% of $SiO_2$ relative to the pigment used, were added over a period of 15 minutes. After stirring for a further 5 minutes, a pH value of 7.0 was established over a period of 15 minutes by the addition of sodium hydroxide solution (50 wt.%). 204 ml of sodium hydroxide solution (50 wt.%) were then added over a period of 15 minutes. 60 ml of aluminum sulphate solution (100 g/l $Al_2O_3$), corresponding to 2.2 wt.% of $Al_2O_3$ relative to the pigment used, were then added over a period of 15 minutes. After stirring for a further 30 minutes the pH value of the suspension was 7.5. After stirring for a further 5 minutes the post-treated pigment was separated in a filtering flask through "Blauband" filters (Schleicher & Schuell) at 300 mbar and washed with distilled water at 80° C. in a water: pigment weight ratio of 10:1. The resistivity of the pigment was 8 200 Ohm.cm. The process according to the invention achieves the same quality of pigment with a 40% washing water saving.

Example 3

A $TiO_2$ rutile pigment produced using the sulphate process was post-treated in-organically as follows.

4.0 kg of ground $TiO_2$ pigment were dispersed in 12 l of water with the addition of a dispersing agent. The suspension was stirred and kept at 35° C. throughout post-treatment. The pH value of the suspension was pH 11.9. 60 ml of titanyl sulphate solution (120 g/l $TiO_2$), corresponding to 0.18 wt.% of $TiO_2$ relative to the pigment used, were added to the stirred suspension over a period of 10 minutes. The pH value thereafter was 6.5. 107 ml of titanyl sulphate solution (120 g/l $TiO_2$) corresponding to 0.32 wt.% of $TiO_2$ relative to the pigment used and 53 ml of sodium aluminate solution (303 g/l $Al_2O_3$) corresponding to 0.4 wt.% of $Al_2O_3$ relative to the pigment, were then added simultaneously over a period of 20 minutes. After stirring for a further 15 minutes the pH value of the suspension was 6.5. The pH value was then maintained at 6.5 while, over a period of 35 minutes, 97 ml of aluminum sulphate solution (100 g/l $Al_2O_3$), corresponding to 0.24 wt.% of $Al_2O_3$, and 49 ml of sodium aluminate solution (303 g/l $Al_2O_3$), corresponding to 0.36 wt.% of $Al_2O_3$ relative to the pigment, were added simultaneously. After stirring for a further 15 minutes, the post-treated pigment was separated in a filtering flask through "Blauband" filters (Schleicher & Schuell) at 300 mbar and washed with distilled water at 80° C. in a water pigment weight ratio of 2:1. The resistivity of the pigment was 10 500 Ohm.cm.

Example 4 (Comparison)

A $TiO_2$ rutile pigment produced using the sulphate process was post-treated inorganically as follows.

4.0 kg of ground $TiO_2$ pigment were dispersed in 12 l of water with the addition of a dispersing agent. The suspension was stirred and kept at 35° C. throughout post-treatment. The pH value of the suspension was 12.0. 167 ml of titanyl sulphate solution (120 g/l $TiO_2$), corresponding to 0.5 wt.% of $TiO_2$ relative to the pigment used, were added to the stirred suspension over a period of 15 minutes. After stirring for a further 5 minutes the pH value of the suspension was 1.6. 149 ml of sodium hydroxide solution (50 wt.%) were then added over a period of 15 minutes. After stirring for a further 5 minutes the pH value of the suspension was 13.2. 400 ml of aluminum sulphate solution (100 g/l $Al_2O_3$), corresponding to 1.0 wt.% of $Al_2O_3$ relative to the pigment, were then added over a period of 15 minutes. After stirring for a further 5 minutes the pH value was 6.0. Over a period of 15 minutes a pH value of 7.0 was established by the addition of sodium hydroxide solution. After stirring for a further 5 minutes the post-treated pigment was separated in a filtering flask through"Blauband" filters (Schleicher & Schuell) at 300 mbar and washed with distilled water at 80° C. in a water: pigment weight ratio of 2:1. The resistivity of the pigment was 6 500 Ohm.cm. With the same washing water consumption it was possible to improve resistivity by 61.5% by the process according to the invention.

We claim:

1. A process for producing inorganically coated pigments or fillers comprising the steps of preparing an aqueous suspension of untreated pigment or filler, precipitation onto the pigment or filler at least one coating of an oxide, hydroxide or hydrated oxide of one or more metals selected from the group consisting of titanium, aluminum, zirconium, silicon, cerium and zinc by adding appropriate metallic salt solutions, precipitating onto the pigment or filler an outer coating of aluminum hydroxide or hydrated aluminum oxide by simultaneously or successively adding an acidic-reacting, water-soluble aluminum compound in an amount of 0.1 to 3 wt. %, calculated as $Al_2O_3$ and relative to the pigment or filler, and a water-soluble alkaline-reacting aluminum compound in an amount of 0.1 to 3 wt %, calculated as $Al_2O_3$ and relative to the pigment or filter, in such a quantity ratio that after completion of the addition a pH value of from 4 to 10 is established in the suspension without further acidic- or alkaline-reacting components being added, adjusting the aqueous suspension approximately to neutral prior to separation of the pigment or filler, separating the pigment or filler treated in this manner, washing the separated pigment or filler, and disagglomerating the pigment or filler.

2. A process according to claim 1, wherein the addition of the water-soluble acidic-reacting aluminum compound and the addition of the water-soluble, alkaline reacting aluminum compound are effected simultaneously in such a way that the pH value of the suspension is constant throughout the addition period and lies between 4 and 10.

3. A process according to claim 2, wherein the pH value of the suspension lies between 5 and 9 during the addition of the acidic- and alkaline-reacting aluminum compounds.

4. A process according to claim 2, wherein the pH value of the suspension lies between 6 and 8 during the addition of the acidic- and alkaline-reacting aluminum compounds.

5. A process according to claim 1, including the step of maintaining the temperature of the suspension between 25° and 70° C.

6. A process according to claim 1, wherein the pigment is titanium dioxide.

7. A process according to claim 1, wherein the pigment is iron oxide.

8. A process of using the pigment or filler produced according to claim 1, including the step of introducing the pigment or filler into coloring paints, lacquers, plastics and paper.

* * * * *